United States Patent
Chamberlain

(10) Patent No.: US 9,701,578 B2
(45) Date of Patent: Jul. 11, 2017

(54) REACTIVE MELT INFILTRATED-CERAMIC MATRIX COMPOSITE

(71) Applicant: Rolls-Royce Corporation, Indianapolis, IN (US)

(72) Inventor: Adam Lee Chamberlain, Mooresville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 699 days.

(21) Appl. No.: 14/141,969

(22) Filed: Dec. 27, 2013

(65) Prior Publication Data

US 2014/0272377 A1     Sep. 18, 2014

Related U.S. Application Data

(60) Provisional application No. 61/802,199, filed on Mar. 15, 2013.

(51) Int. Cl.
  *C03C 17/34* (2006.01)
  *F01D 25/00* (2006.01)
  (Continued)

(52) U.S. Cl.
  CPC ........ *C03C 17/3435* (2013.01); *C04B 35/565* (2013.01); *C04B 35/5622* (2013.01); *C04B 35/573* (2013.01); *C04B 35/58078* (2013.01); *C04B 35/58092* (2013.01); *C04B 35/591* (2013.01); *C04B 35/62868* (2013.01); *C04B 35/62884* (2013.01); *C04B 35/80* (2013.01); *C04B 35/806* (2013.01); *F01D 25/005* (2013.01); *C04B 2235/3813* (2013.01);
  (Continued)

(58) Field of Classification Search
  None
  See application file for complete search history.

(56) References Cited

U.S. PATENT DOCUMENTS

2005/0233127 A1 * 10/2005 Steffier ................... B32B 18/00
                                                      428/292.1

FOREIGN PATENT DOCUMENTS

EP          0798280 A2      10/1997
JP          0798280 A2  *  10/1997 ........... C04B 35/573
                (Continued)

OTHER PUBLICATIONS

International Search Report and Written Opinion, mailed Jul. 21, 2014 for International Application No. PCT/US2014/028827, filed Mar. 14, 2014.

*Primary Examiner* — Michael P Rodriguez
(74) *Attorney, Agent, or Firm* — Brinks Gilson & Lione

(57) ABSTRACT

A method includes providing a ceramic fiber preform with a range of 20 to 40 volume percent fiber which can include silicon carbide fibers; coating the ceramic fiber preform with a boron nitride interface coating; infiltrating the ceramic fiber preform with a ceramic matrix with a range of 20 to 40 volume percent silicon carbide; infiltrating the ceramic fiber preform with a constituent material such as boron carbide, boron, and carbon; and infiltrating the ceramic fiber preform with a eutectic melt material where the metallic eutectic melt can include at least one material from a group consisting of: a transition metal-silicon eutectic melt such as zirconium silicide, a transition metal-boride eutectic melt such as zirconium boride, and a transition metal-carbide eutectic melt such as zirconium carbide.

14 Claims, 2 Drawing Sheets

(51) Int. Cl.
*C04B 35/56* (2006.01)
*C04B 35/565* (2006.01)
*C04B 35/58* (2006.01)
*C04B 35/628* (2006.01)
*C04B 35/80* (2006.01)
*C04B 35/573* (2006.01)
*C04B 35/591* (2006.01)

(52) U.S. Cl.
CPC ............ *C04B 2235/3821* (2013.01); *C04B 2235/3826* (2013.01); *C04B 2235/3839* (2013.01); *C04B 2235/3891* (2013.01); *C04B 2235/42* (2013.01); *C04B 2235/422* (2013.01); *C04B 2235/524* (2013.01); *C04B 2235/5244* (2013.01); *C04B 2235/614* (2013.01); *C04B 2235/616* (2013.01); *Y10T 428/249969* (2015.04); *Y10T 428/31678* (2015.04)

(56) References Cited

FOREIGN PATENT DOCUMENTS

| WO | WO 98/24737 | 6/1998 | |
| WO | WO 9824737 A1 * | 6/1998 | ............ B28B 1/265 |

* cited by examiner

REACTIVE MELT INFILTRATED-CERAMIC MATRIX COMPOSITE

CROSS-REFERENCE TO RELATED APPLICATIONS

This application claims priority to U.S. Provisional Application Ser. No. 61/802,199, entitled "Reactive Melt Infiltrated Ceramic Matrix Composite," filed Mar. 15, 2013, which is hereby incorporated by reference in its entirety.

TECHNICAL FIELD

The present invention generally relates to composite materials, and more particularly, but not exclusively, to ceramic matrix composites for high temperature turbine engine components.

BACKGROUND

Present approaches to ceramic matrix composites suffer from a variety of drawbacks, limitations, disadvantages and problems including those respecting operating temperatures and others. Silicon carbide composites having metallic silicon as the melt infiltrate are limited to operating temperatures below the melting point of silicon. Otherwise, the ceramic matrix composite will degrade and lead to component failure.

SUMMARY

One embodiment of the present invention is a unique ceramic matrix composite. Other embodiments include apparatuses, systems, devices, hardware, methods, and combinations for ceramic matrix composites. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
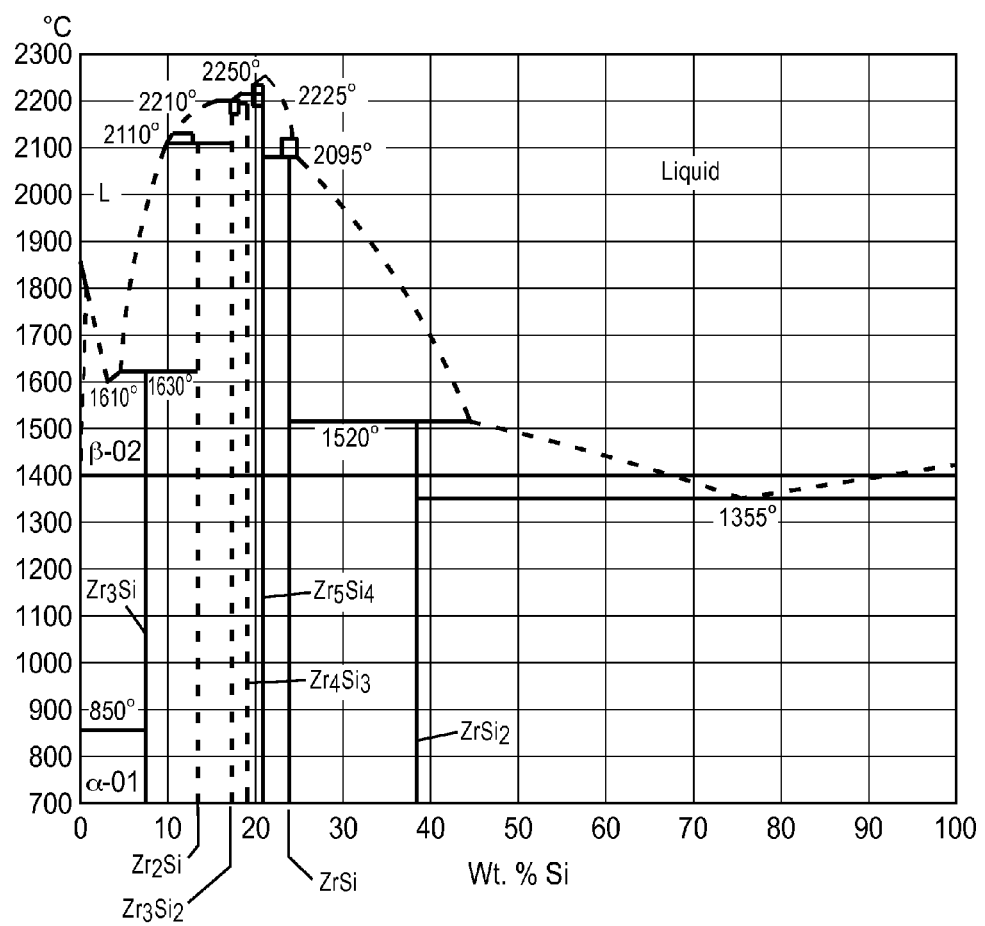
FIG. 1 illustrates a Zirconium-Silicon phase diagram.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

An embodiment of the present application includes a method for producing a ceramic matrix composite. A ceramic matrix composite produced by a method of one embodiment can include a porosity level below 8% and temperature capabilities above 2400° F. The composite can be applied to high temperature applications such as a high performance turbine propulsion engines. High temperature components of a turbine propulsion engine can include but are not limited to blades, vanes, blade tracks, combustor liners and the like. A method of this embodiment can include providing a ceramic fiber preform; coating the ceramic fiber preform with a boron nitride interface coating; infiltrating the ceramic fiber preform with a ceramic matrix; infiltrating the ceramic fiber preform with a constituent material; and infiltrating the ceramic fiber preform with a eutectic melt material.

A ceramic fiber preform is provided for a ceramic matrix composite in one embodiment. The material selected for the ceramic fiber preform can include a high melting temperature carbide based fiber. Examples of carbide based fibers can include, but are not limited to silicon carbide, zirconium carbide, hafnium carbide, tungsten carbide, titanium carbide, and others. In one specific embodiment, the ceramic fiber preform is formed with at least a part of the preform including silicon carbide.

In another embodiment of the present application, the ceramic fiber preform is coated with an inorganic material interface coating. In one specific embodiment, the coating is a boron nitride interface coating. The coating can be applied with various processes such as, but not limited to, chemical vapor infiltration, dipping, spraying, physical vapor deposition, chemical vapor deposition, pyrolysis, plasma spraying, directed vapor deposition, electroplating, and any other coating process known in the art.

In various embodiments, infiltrating the ceramic fiber preform further includes infiltrating with at least one operation selected from a group consisting of: polymer infiltrating, chemical vapor infiltrating, slurry infiltrating, so-gel infiltrating, chemical vapor depositing, physical vapor depositing, melt infiltrating, direct metal oxidizing, liquid infiltrating, reaction processing, polymer pyrolysis, consolidation diffusion bonding, squeeze infiltrating, spray depositing, slurry casting, and the like. In one embodiment, infiltrating the ceramic fiber preform further includes infiltrating with at least one operation selected from a group consisting of: chemical vapor infiltrating and reaction melt infiltrating.

Multiple phases of infiltration of the ceramic fiber preform, including for example a ceramic matrix, a constituent material, and a eutectic melt material, can be applied individually or as a group. In other embodiments, multiple phases of infiltration can be applied in various orders with various processes and materials.

In further embodiments, infiltrating can include using a combination of melt infiltration and reactive processing. With this method, one material infiltrated in the composite preform reacts with a second material to form the ceramic matrix. For example, reaction-bonded silicon nitride can be formed when metallic silicon reacts with nitrogen. In another example, a porous carbon constituent material can react with a silicon-based matrix material to form a silicon carbide component for the ceramic matrix composite.

When infiltrating the ceramic fiber preform with a ceramic matrix, at least a portion of the matrix material can include, but not be limited to, carbides, nitrides and silicides. Infiltrating the ceramic fiber preform with a constituent material can include materials such as but not limited to carbon, boron, boron carbide, and the like. Infiltrating the ceramic fiber preform with a eutectic melt material can include using at least one of a silicon, a carbide, a boride, a refractory metal silicon alloy, and a transition metal-silicon eutectic material, for example. One specific embodiment can include infiltrating the ceramic fiber preform with a ceramic matrix of silicon carbide, a constituent material of boron carbide, and a eutectic melt material of zirconium silicide.

With reference to FIG. 1, an exemplary phase diagram of a silicon-zirconium system demonstrates the various properties of eutectic points when reacting silicon and zirconium. Other phase diagrams exist which demonstrate such properties for other element combinations for application in various embodiments. A eutectic or eutectic mixture is a mixture of two or more phases at a composition that has the lowest relative melting point, and where the phases simultaneously crystallize from molten solution at this temperature. Upon cooling, at the eutectic, both components crystallize out together (in the ratio of the eutectic mixture) until all the melt is gone. All heat exchange at the eutectic point relates to the phase transformation and not to a change in temperature. After all the melt is gone the two components can leave the eutectic with the original composition.

In the reverse when raising the temperature for melting, the composition sits at the eutectic point until all of the least abundant component is melted or all of the remaining un-melted component is the more abundant component. As the temperature continues to rise, the system will climb the melt+abundant component liquidus line until it reaches the melting temperature for the original composition at which point the last portion of the more abundant component melts. Eutectic points provide the lowest melting temperature of the system and are identified from phase diagrams. From FIG. 1, the lowest melting temperature of various zirconium-silicon compositions can be determined. The composition with the lowest melt temperature can serve as an indicator regarding the thermal capabilities of the component.

Another embodiment of the present application includes a method for reaction melt infiltrating a ceramic matrix composite by producing a coated preform including a ceramic fibrous structure and a boron nitride interface coating; infiltrating the coated preform with a ceramic matrix; infiltrating the coated preform and the ceramic matrix with a constituent material; and infiltrating the coated preform and the ceramic matrix having the constituent material with a metallic eutectic melt.

In various embodiments, producing a coated preform including a ceramic fibrous structure and a boron nitride interface coating can further include forming the ceramic fibrous structure with a range of 20 to 40 volume percent fiber. In one embodiment, at least a portion of the fibrous structure includes silicon carbide fibers. In another embodiment, the boron nitride interface coating is applied using processes such as, but not limited to, chemical vapor infiltrating, dipping, spraying, physical vapor depositing, chemical vapor depositing, directed vapor depositing, pyrolysis, and any other coating process known in the art. In a specific embodiment, the interface coating is applied using chemical vapor infiltration.

In other embodiments, infiltrating the coated preform with the ceramic matrix can include infiltrating a silicon carbide fiber preform with a matrix material such as a carbide, a nitride, and a boride using polymer infiltration, chemical vapor infiltration, slurry infiltration, spray deposition, direct metal oxidation or various combinations of these. Embodiments can include providing the ceramic matrix with a range of 20 to 40 volume percent matrix material. In one specific embodiment, the coated preform is infiltrated until the matrix contains 20 to 40 volume percent silicon carbide.

In still other embodiments, infiltrating the coated preform and the ceramic matrix with the constituent material can include infiltrating with boron carbide, carbon, boron and various combinations of these. The volume percent of constituent(s) will depend on the melt infiltrate selected and on the final composition. One embodiment includes providing constituent material to the coated preform and ceramic matrix until a range of 5 to 15 volume percent constituent material is reached.

In yet another embodiment, infiltrating the coated preform and the ceramic matrix having the constituent material with the metallic eutectic melt can include a transition metal silicon eutectic melt. The amount of eutectic melt infiltrated can take up the remaining void space. In a specific embodiment, the eutectic melt is infiltrated until at least 10 volume percent of the ceramic matrix composite is the metallic eutectic melt.

For one example of an embodiment of the present application, if the final composition is to contain silicon carbide, zirconium diboride and a zirconium silicide, then the Zr—Si eutectic melt would contain 97.1 weight percent zirconium and 2.9 weight percent silicon with a silicon carbide structure and a silicon carbide matrix. The final composition of zirconium silicide will depend on the volume percent and composition of the constituents selected.

Figure 2:
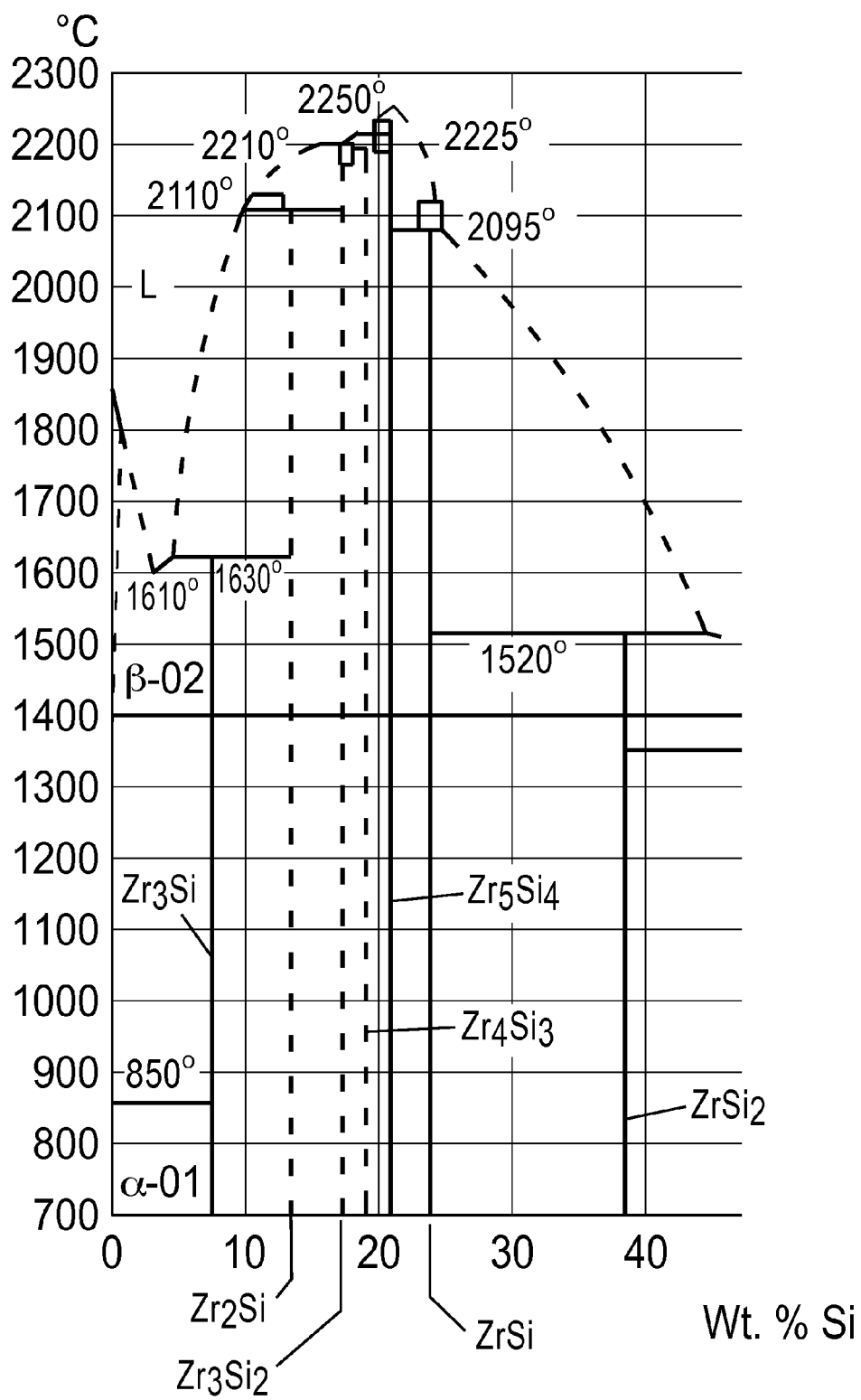
FIG. 2 illustrates a portion of a Zirconium-Silicon phase diagram.

FIG. 2 is a highlighted portion of the zirconium-silicon phase diagram showing a eutectic point region for a Zr—Si composition. In another example and with reference to FIG. 2, if a boron carbide is selected for the constituent material for a final composition of silicon carbide, zirconium diboride, zirconium carbide, zirconium silicide ($Zr_5Si_4$ or $Zr_3Si_2$) and potentially un-reacted boron carbide, the lowest melting temperature component present is the zirconium silicide with a melting point of approximately 2210° C. This is an 800° C. increase in thermal capability when compared to metallic silicon. With a eutectic alloy, the mixture transforms from liquid-solid and solid-liquid as one at a single sharp melting point temperature—the eutectic temperature. An alloy with components in eutectic proportions can form the eutectic compound(s) and exhibit eutectic melting properties. While in contrast, a non-eutectic alloy exhibits a plastic melting range with low melting point components melting first. If, for example, a composition would include un-reacted silicon, the silicon in the non-eutectic alloy would begin to melt at the melting temperature for silicon around 1400° C. reducing the thermal capability of a ceramic matrix composite.

Alternatively, an embodiment with a method for reactive melt infiltrating a ceramic matrix composite can further include heat treating the ceramic fiber preform. Heat treatment can be applied during various stages of the method including before or after producing a coated perform and infiltrating the perform with any of a ceramic matrix, a constituent material, and a eutectic melt. Heat treating can be applied multiple times with various parameters. Heat treating can include conventional processes such as annealing, aging, case hardening, precipitation strengthening, tempering and quenching.

For one embodiment, the method can include heat treating the ceramic matrix composite between 2400-2600° F. to further react the eutectic melt infiltrate with the matrix constituents. While this temperature is below the eutectic melt temperature in order to maintain at least some of the physical properties of the composite, the reaction can be based on non-liquid state reactions such as solid state diffusion, for example. The application of further heat treating can be in response to the materials selected and the parameters of any preceding forming or infiltrating processes.

Yet another embodiment of the present application includes an apparatus with a ceramic fibrous structure; a boron nitride interface coating; and a ceramic matrix having a constituent material and a metallic eutectic melt. The ceramic fibrous structure can include a carbide. At least a portion of the ceramic fibrous structure can include at least one material from a group consisting of: silicon carbide, zirconium carbide, and hafnium carbide.

Silicon carbide can be applied as the matrix material in one embodiment and the silicon carbide matrix can include a porosity of less than 5%. Reduced porosity can improve fatigue and thermal conductivity of a composite material. In another embodiment, the ceramic matrix of a composite component can be free of residual silicon. The reduction of residual silicon can provide adequate mechanical properties in thermal environments above 2400° F. As the reactive melt consumes the silicon, the reaction should continue until the residual silicon is exhausted. The combination of reduced porosity and reduce residual silicon metal can contribute to high temperature mechanical properties including proportional limit stress, in-planar shear strength, interlaminar tensile and shear strength.

In another embodiment, the constituent material can include at least one material from a group consisting of: boron carbide, boron, and carbon. In a further embodiment, the metallic eutectic melt can include at least one material from a group consisting of: a transition metal-silicon eutectic melt, a transition metal-boride eutectic melt, and a transition metal-carbide eutectic melt. In a further embodiment, the metallic eutectic melt can include at least one material from a group consisting of: zirconium boride, zirconium carbide, and zirconium silicide.

In gas turbine engine component applications, high thermal conductivity intermetallics and below threshold porosity levels can provide thermal conductivity improvements allowing reduced cooling air requirements and reduced thermal stresses due to the level of through thickness thermal conductivity. High temperature capabilities can provide improved thermal shock resistance allowing for larger thermal gradients and higher heat fluxes in the design of components.

One aspect of the present application is a method including providing a ceramic fiber preform; coating the ceramic fiber preform with a boron nitride interface coating where the coating can further include coating with a chemical vapor infiltration process; infiltrating the ceramic fiber preform with a ceramic matrix; infiltrating the ceramic fiber preform with a constituent material; and infiltrating the ceramic fiber preform with a eutectic melt material.

Features of this aspect can include providing the ceramic fiber preform using a silicon carbide; infiltrating the ceramic fiber preform with at least one operation selected from a group consisting of: polymer infiltrating, chemical vapor infiltrating, and slurry infiltrating; infiltrating the ceramic fiber preform with a ceramic matrix of silicon carbide; infiltrating the ceramic fiber preform with a constituent material using a boron carbide; infiltrating the ceramic fiber preform with the eutectic melt material using a transition metal-silicon eutectic melt such as zirconium silicide. Further features can include heat treating the ceramic fiber preform.

Another aspect of the present application is a method including producing a coated preform including a ceramic fibrous structure and a boron nitride interface coating; infiltrating the coated preform with a ceramic matrix; infiltrating the coated preform and the ceramic matrix with a constituent material; and infiltrating the coated preform and the ceramic matrix having the constituent material with a metallic eutectic melt.

Features of this aspect can include producing the coated preform by forming the ceramic fibrous structure with a range of 20 to 40 volume percent fiber; infiltrating the coated preform with the ceramic matrix by providing the ceramic matrix with a range of 20 to 40 volume percent silicon carbide; infiltrating the coated preform and the ceramic matrix with the constituent material by providing a range of 5 to 15 volume percent constituent material; and infiltrating the coated preform and the ceramic matrix having the constituent material with the metallic eutectic melt by infiltrating to at least 10 volume percent metallic eutectic melt.

Yet another aspect of the present application is an apparatus including a ceramic fibrous structure; a boron nitride interface coating; and a ceramic matrix including a constituent material and a metallic eutectic melt.

Features of this aspect can include the ceramic matrix having a porosity of less than 5%; the ceramic matrix being free of residual silicon; the ceramic fibrous structure having at least one material from a group consisting of: silicon carbide, zirconium carbide, and hafnium carbide; the ceramic matrix having a silicon carbide; the constituent material having at least one material from a group consisting of: boron carbide, boron, and carbon; the metallic eutectic melt having at least one material from a group consisting of: a transition metal-silicon eutectic melt, a transition metal-boride eutectic melt, and a transition metal-carbide eutectic melt; and the metallic eutectic melt having at least one material from a group consisting of: zirconium boride, zirconium carbide, and zirconium silicide.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method comprising:
   providing a ceramic fiber preform;
   coating the ceramic fiber preform with a boron nitride interface coating;
   infiltrating the ceramic fiber preform with a ceramic matrix material;
   infiltrating the ceramic fiber preform with a constituent material comprising boron carbide, boron, carbon or combinations thereof; and
   infiltrating the ceramic fiber preform with a eutectic melt material.

2. The method of claim 1, wherein the coating of the ceramic fiber preform comprises a chemical vapor infiltration process.

3. The method of claim 1, wherein the infiltrating of the ceramic fiber preform with a ceramic matrix material comprises at least one operation selected from a group consisting of: polymer infiltrating, chemical vapor infiltrating, and slurry infiltrating.

4. The method of claim 1, further including heat treating the ceramic fiber preform.

5. The method of claim 1, wherein the ceramic fiber preform comprises a silicon carbide.

6. The method of claim 1, wherein the ceramic matrix material comprises a silicon carbide.

7. The method of claim 1, wherein the constituent material comprises boron carbide.

8. The method of claim 1, wherein the eutectic melt material comprises a transition metal-silicon eutectic melt.

9. The method of claim 1, wherein the eutectic melt material comprises zirconium and silicon.

10. A method comprising:
producing a coated preform including a ceramic fibrous structure and a boron nitride interface coating;
infiltrating the coated preform with a ceramic matrix material;
infiltrating the coated preform and the ceramic matrix material with a constituent material comprising boron carbide, boron, carbon or combinations thereof; and
infiltrating the coated preform and the ceramic matrix material having the constituent material with a metallic eutectic melt.

11. The method of claim 10, wherein the producing of the coated preform comprises forming the ceramic fibrous structure with a range of 20 to 40 volume percent fiber.

12. The method of claim 11, wherein the infiltrating of the coated preform with the ceramic matrix material comprises providing the ceramic matrix with a range of 20 to 40 volume percent silicon carbide.

13. The method of claim 12, wherein the infiltrating of the coated preform and the ceramic matrix material with the constituent material comprises providing a range of 5 to 15 volume percent constituent material.

14. The method of claim 13, wherein the infiltrating of the coated preform and the ceramic matrix material having the constituent material with the metallic eutectic melt comprises infiltrating to at least 10 volume percent metallic eutectic melt.

* * * * *